United States Patent [19]

Luebrecht et al.

[11] Patent Number: 4,543,031

[45] Date of Patent: Sep. 24, 1985

[54] APPARATUS FOR SIDESHIFT CARRIAGE CONTROL

[75] Inventors: Donald Luebrecht, Fort Jennings; Nicholas D. Thobe, Celina, both of Ohio

[73] Assignee: Crown Controls Corporation, New Bremen, Ohio

[21] Appl. No.: 487,626

[22] Filed: Apr. 22, 1983

[51] Int. Cl.$^4$ .......... B66F 9/14; B60P 1/34

[52] U.S. Cl. .......... 414/631; 414/665; 414/674

[58] Field of Search .......... 414/667, 671, 630, 631, 414/662, 663, 664, 665, 282, 273, 277, 279, 281, 283, 266, 786, 674

[56] References Cited

U.S. PATENT DOCUMENTS

| | | | |
|---|---|---|---|
| 3,096,896 | 7/1963 | Norton et al. | 414/670 |
| 3,139,994 | 7/1964 | Chasar | 414/282 X |
| 3,202,242 | 8/1965 | Dolphin | 414/666 X |
| 3,202,303 | 8/1965 | Chasar | 414/282 |
| 3,233,754 | 2/1966 | Crile et al. | 414/273 X |
| 3,241,697 | 3/1966 | Rogant | 414/666 |
| 3,402,835 | 9/1968 | Saul | 414/282 X |
| 3,554,390 | 1/1971 | Saul | 414/282 X |
| 3,701,442 | 10/1972 | Dunning et al. | 414/273 |
| 3,746,189 | 7/1973 | Burch et al. | 414/273 |
| 3,809,259 | 5/1974 | Pipes | 414/280 |
| 3,820,674 | 6/1974 | Goodacre et al. | 414/666 |
| 3,937,346 | 2/1976 | van der Laan | 414/666 |
| 3,998,346 | 12/1976 | Gibson et al. | 414/666 |
| 4,008,668 | 2/1977 | Goussard | 414/273 X |
| 4,218,170 | 8/1980 | Goodacre | 414/666 |
| 4,236,862 | 12/1980 | McCormick | 414/633 |
| 4,439,102 | 3/1984 | Allen | 414/631 X |

*Primary Examiner*—Robert J. Spar
*Assistant Examiner*—Stuart J. Millman
*Attorney, Agent, or Firm*—Biebel, French & Nauman

[57] ABSTRACT

In a material handling vehicle having an operator platform, a sideshift carriage mounted for lateral movement relative to the platform, a traverse carriage mounted for lateral movement relative to the sideshift carriage and forks mounted to the traverse carriage, an improved sideshift control system monitors the position of the sideshift carriage to define home positions for the sideshift carriage relative to the platform. Two home positions are defined, one for the forks facing to each side of the vehicle. The home positions offset the sideshift carriage to one or the other side of the platform to substantially center the load on the vehicle such that a portion of the base of the forks extends a set distance beyond one side of the platform, and the load supported on the forks extends approximately an equal distance beyond the opposite side of the platform. Two electrical switches are mounted approximately at the center of the platform opposite to the sideshift carriage and an activating plate includes two projections which operate alternate ones of the two switches dependent upon the direction the sideshift carriage is extended. A variety of actuating plates conveniently change the home positions and, hence, the preferred load carrying position of the forks for selected applications.

16 Claims, 12 Drawing Figures

FIG-7A

0-SWITCH IS OPEN
1-SWITCH IS CLOSED

X-DON'T CARE

0-NOT ACTIVE
1-ACTIVE

| | INPUTS | | | | | | | | | | OUTPUTS | | | | | | | | |
|---|---|---|---|---|---|---|---|---|---|---|---|---|---|---|---|---|---|---|---|
| | COMMAND SWITCHES | | | | CONDITION SWITCHES | | | | | | SOLENOIDS-LIGHTS-LOGIC SIGNAL | | | | | ACTION | | | |
| | RTS | RT | LT | | RRS | RLS | TRS | TLS | SRS | SLS | SS1 | S60 | SS0 | SS2 | SS4 | SSR | SSL | TR | TL |
| 1 | | 0 | 0 | | 0 | 0 | 0 | 0 | 0 | 0 | 0 | 0 | 0 | 0 | 0 | 0 | 0 | 0 | 0 |
| 2 | | 0 | 0 | | 0 | 0 | 0 | 0 | 0 | 0 | 0 | 0 | 0 | 0 | 0 | 0 | 0 | 0 | 0 |
| 3 | | 0 | 0 | | 0 | 0 | 0 | 0 | 0 | 1 | 0 | 0 | 0 | 0 | 0 | 0 | 0 | 0 | 0 |
| 4 | | 0 | 0 | | 0 | 0 | 0 | 0 | 0 | 1 | 0 | 0 | 0 | 0 | 0 | 0 | 0 | 0 | 0 |
| 5 | | 0 | 0 | | 0 | 0 | 0 | 0 | 1 | 0 | 0 | 0 | 0 | 0 | 0 | 0 | 0 | 0 | 0 |
| 6 | | 0 | 0 | | 0 | 0 | 0 | 0 | 1 | 0 | 0 | 0 | 0 | 0 | 0 | 0 | 0 | 0 | 0 |
| 7 | | 0 | 0 | | 0 | 0 | 0 | 1 | 0 | 0 | 0 | 0 | 0 | 0 | 0 | 0 | 0 | 0 | 0 |
| 8 | | 0 | 0 | | 0 | 0 | 0 | 1 | 0 | 0 | 0 | 0 | 0 | 0 | 0 | 0 | 0 | 0 | 0 |
| 9 | | 0 | 0 | | 0 | 0 | 0 | 1 | 0 | 1 | 0 | 0 | 0 | 1 | 0 | 0 | 0 | 0 | 0 |
| 10 | | 0 | 0 | | 0 | 0 | 0 | 1 | 0 | 1 | 0 | 0 | 0 | 1 | 0 | 0 | 0 | 0 | 0 |
| 11 | | 0 | 0 | | 0 | 0 | 0 | 1 | 1 | 0 | 0 | 0 | 0 | 0 | 0 | 0 | 0 | 0 | 0 |
| 12 | | 0 | 0 | | 0 | 0 | 0 | 1 | 1 | 0 | 0 | 0 | 0 | 0 | 0 | 0 | 0 | 0 | 0 |
| 13 | | 0 | 0 | | 0 | 0 | 1 | 0 | 0 | 0 | 0 | 0 | 0 | 0 | 0 | 0 | 0 | 0 | 0 |
| 14 | | 0 | 0 | | 0 | 0 | 1 | 0 | 0 | 0 | 0 | 0 | 0 | 0 | 0 | 0 | 0 | 0 | 0 |
| 15 | | 0 | 0 | | 0 | 0 | 1 | 0 | 0 | 1 | 0 | 0 | 0 | 0 | 0 | 0 | 0 | 0 | 0 |
| 16 | | 0 | 0 | | 0 | 0 | 1 | 0 | 0 | 1 | 0 | 0 | 0 | 0 | 0 | 0 | 0 | 0 | 0 |
| 17 | | 0 | 0 | | 0 | 0 | 1 | 0 | 1 | 0 | 0 | 0 | 0 | 1 | 0 | 0 | 0 | 0 | 0 |
| 18 | | 0 | 0 | | 0 | 0 | 1 | 0 | 1 | 0 | 0 | 0 | 0 | 1 | 0 | 0 | 0 | 0 | 0 |
| 19 | | 0 | 0 | | 0 | 1 | 0 | 0 | 0 | 0 | 0 | 0 | 1 | 0 | 0 | 0 | 0 | 0 | 0 |
| 20 | | 0 | 0 | | 0 | 1 | 0 | 0 | 0 | 0 | 0 | 0 | 1 | 0 | 0 | 0 | 0 | 0 | 0 |
| 21 | | 0 | 0 | | 0 | 1 | 0 | 0 | 0 | 1 | 0 | 0 | 1 | 0 | 0 | 0 | 0 | 0 | 0 |
| 22 | | 0 | 0 | | 0 | 1 | 0 | 0 | 0 | 1 | 0 | 0 | 1 | 0 | 0 | 0 | 0 | 0 | 0 |
| 23 | | 0 | 0 | | 0 | 1 | 0 | 0 | 1 | 0 | 0 | 0 | 1 | 0 | 0 | 0 | 0 | 0 | 0 |
| 24 | | 0 | 0 | | 0 | 1 | 0 | 0 | 1 | 0 | 0 | 0 | 1 | 0 | 0 | 0 | 0 | 0 | 0 |
| 25 | | 0 | 0 | | 0 | 1 | 0 | 1 | 0 | 0 | 0 | 0 | 1 | 0 | 0 | 0 | 0 | 0 | 0 |
| 26 | | 0 | 0 | | 0 | 1 | 0 | 1 | 0 | 0 | 0 | 0 | 1 | 0 | 0 | 0 | 0 | 0 | 0 |
| 27 | | 0 | 0 | | 0 | 1 | 0 | 1 | 0 | 1 | 0 | 0 | 1 | 0 | 0 | 0 | 0 | 0 | 0 |
| 28 | | 0 | 0 | | 0 | 1 | 0 | 1 | 0 | 1 | 0 | 0 | 1 | 0 | 0 | 0 | 0 | 0 | 0 |
| 29 | | 0 | 0 | | 0 | 1 | 0 | 1 | 1 | 0 | 0 | 0 | 1 | 0 | 0 | 0 | 0 | 0 | 0 |
| 30 | | 0 | 0 | | 0 | 1 | 0 | 1 | 1 | 0 | 0 | 0 | 1 | 0 | 0 | 0 | 0 | 0 | 0 |
| 31 | | 0 | 0 | | 0 | 1 | 1 | 0 | 0 | 0 | 0 | 0 | 1 | 0 | 0 | 0 | 0 | 0 | 0 |
| 32 | | 0 | 0 | | 0 | 1 | 1 | 0 | 0 | 0 | 0 | 0 | 1 | 0 | 0 | 0 | 0 | 0 | 0 |
| 33 | | 0 | 0 | | 0 | 1 | 1 | 0 | 0 | 1 | 0 | 0 | 1 | 0 | 0 | 0 | 0 | 0 | 0 |
| 34 | | 0 | 0 | | 0 | 1 | 1 | 0 | 0 | 1 | 0 | 0 | 1 | 0 | 0 | 0 | 0 | 0 | 0 |
| 35 | | 0 | 0 | | 0 | 1 | 1 | 0 | 1 | 0 | 0 | 0 | 1 | 1 | 1 | 0 | 0 | 0 | 0 |
| 36 | | 0 | 0 | | 0 | 1 | 1 | 0 | 1 | 0 | 0 | 0 | 1 | 1 | 1 | 0 | 0 | 0 | 0 |
| 37 | | 0 | 0 | | 1 | 0 | 0 | 0 | 0 | 0 | 0 | 0 | 1 | 0 | 0 | 0 | 0 | 0 | 0 |
| 38 | | 0 | 0 | | 1 | 0 | 0 | 0 | 0 | 0 | 0 | 0 | 1 | 0 | 0 | 0 | 0 | 0 | 0 |
| 39 | | 0 | 0 | | 1 | 0 | 0 | 0 | 0 | 1 | 0 | 0 | 1 | 0 | 0 | 0 | 0 | 0 | 0 |
| 40 | | 0 | 0 | | 1 | 0 | 0 | 0 | 0 | 1 | 0 | 0 | 1 | 0 | 0 | 0 | 0 | 0 | 0 |
| 41 | | 0 | 0 | | 1 | 0 | 0 | 0 | 1 | 0 | 0 | 0 | 1 | 0 | 0 | 0 | 0 | 0 | 0 |
| 42 | | 0 | 0 | | 1 | 0 | 0 | 0 | 1 | 0 | 0 | 0 | 1 | 0 | 0 | 0 | 0 | 0 | 0 |
| 43 | | 0 | 0 | | 1 | 0 | 0 | 1 | 0 | 0 | 0 | 0 | 1 | 0 | 0 | 0 | 0 | 0 | 0 |
| 44 | | 0 | 0 | | 1 | 0 | 0 | 1 | 0 | 0 | 0 | 0 | 1 | 0 | 0 | 0 | 0 | 0 | 0 |
| 45 | | 0 | 0 | | 1 | 0 | 0 | 1 | 0 | 1 | 0 | 0 | 1 | 1 | 1 | 0 | 0 | 0 | 0 |
| 46 | | 0 | 0 | | 1 | 0 | 0 | 1 | 0 | 1 | 0 | 0 | 1 | 1 | 1 | 0 | 0 | 0 | 0 |
| 47 | | 0 | 0 | | 1 | 0 | 0 | 1 | 1 | 0 | 0 | 0 | 1 | 0 | 0 | 0 | 0 | 0 | 0 |
| 48 | | 0 | 0 | | 1 | 0 | 0 | 1 | 1 | 0 | 0 | 0 | 1 | 0 | 0 | 0 | 0 | 0 | 0 |
| 49 | | 0 | 0 | | 1 | 0 | 1 | 0 | 0 | 0 | 0 | 0 | 1 | 0 | 0 | 0 | 0 | 0 | 0 |
| 50 | | 0 | 0 | | 1 | 0 | 1 | 0 | 0 | 0 | 0 | 0 | 1 | 0 | 0 | 0 | 0 | 0 | 0 |
| 51 | | 0 | 0 | | 1 | 0 | 1 | 0 | 0 | 1 | 0 | 0 | 1 | 0 | 0 | 0 | 0 | 0 | 0 |
| 52 | | 0 | 0 | | 1 | 0 | 1 | 0 | 0 | 1 | 0 | 0 | 1 | 0 | 0 | 0 | 0 | 0 | 0 |
| 53 | | 0 | 0 | | 1 | 0 | 1 | 0 | 1 | 0 | 0 | 0 | 1 | 0 | 0 | 0 | 0 | 0 | 0 |
| 54 | | 0 | 0 | | 1 | 0 | 1 | 0 | 1 | 0 | 0 | 0 | 1 | 0 | 0 | 0 | 0 | 0 | 0 |
| 55 | 1 | X | X | | X | X | X | X | X | X | 1 | X | X | X | X | X | X | X | X |

FIG-7B

O-SWITCH IS OPEN
1-SWITCH IS CLOSED

X-DON'T CARE

O-NOT ACTIVE
1-ACTIVE

| | INPUTS | | | | | | | | | OUTPUTS | | | | | | | | |
|---|---|---|---|---|---|---|---|---|---|---|---|---|---|---|---|---|---|---|
| | COMMAND SWITCHES | | | CONDITION SWITCHES | | | | | | SOLENOIDS-LIGHTS-LOGIC SIGNAL | | | | | ACTION | | | |
| | RTS | RT | LT | RRS | RLS | TRS | TLS | SRS | SLS | SS1 | S60 | SS0 | SS2 | SS4 | SSR | SSL | TR | TL |
| 1 | | 0 | 1 | 0 | 0 | 0 | 0 | 0 | 0 | 1 | 1 | 0 | 0 | 0 | 0 | 1 | 0 | 0 |
| 2 | | 1 | 0 | 0 | 0 | 0 | 0 | 0 | 0 | 1 | 1 | 0 | 0 | 0 | 1 | 0 | 0 | 0 |
| 3 | | 0 | 1 | 0 | 0 | 0 | 0 | 0 | 1 | 1 | 0 | 0 | 0 | 0 | 0 | 0 | 0 | 1 |
| 4 | | 1 | 0 | 0 | 0 | 0 | 0 | 0 | 1 | 1 | 0 | 0 | 0 | 0 | 0 | 0 | 1 | 0 |
| 5 | | 0 | 1 | 0 | 0 | 0 | 0 | 1 | 0 | 1 | 0 | 0 | 0 | 0 | 0 | 0 | 0 | 1 |
| 6 | | 1 | 0 | 0 | 0 | 0 | 0 | 1 | 0 | 1 | 0 | 0 | 0 | 0 | 0 | 0 | 1 | 0 |
| 7 | | 0 | 1 | 0 | 0 | 0 | 1 | 0 | 0 | 1 | 1 | 0 | 0 | 0 | 0 | 1 | 0 | 0 |
| 8 | | 1 | 0 | 0 | 0 | 0 | 1 | 0 | 0 | 1 | 1 | 0 | 0 | 0 | 1 | 0 | 0 | 0 |
| 9 | | 0 | 1 | 0 | 0 | 0 | 1 | 0 | 1 | 1 | 0 | 0 | 1 | 0 | 0 | 0 | 0 | 1 |
| 10 | | 1 | 0 | 0 | 0 | 0 | 1 | 0 | 1 | 1 | 0 | 0 | 1 | 0 | 1 | 0 | 0 | 0 |
| 11 | | 0 | 1 | 0 | 0 | 0 | 1 | 1 | 0 | 1 | 1 | 0 | 0 | 0 | 0 | 1 | 0 | 0 |
| 12 | | 1 | 0 | 0 | 0 | 0 | 1 | 1 | 0 | 1 | 0 | 0 | 0 | 0 | 0 | 0 | 1 | 0 |
| 13 | | 0 | 1 | 0 | 0 | 1 | 0 | 0 | 0 | 1 | 1 | 0 | 0 | 0 | 0 | 1 | 0 | 0 |
| 14 | | 1 | 0 | 0 | 0 | 1 | 0 | 0 | 0 | 1 | 1 | 0 | 0 | 0 | 1 | 0 | 0 | 0 |
| 15 | | 0 | 1 | 0 | 0 | 1 | 0 | 0 | 1 | 1 | 0 | 0 | 0 | 0 | 0 | 0 | 0 | 1 |
| 16 | | 1 | 0 | 0 | 0 | 1 | 0 | 0 | 1 | 1 | 1 | 0 | 0 | 0 | 1 | 0 | 0 | 0 |
| 17 | | 0 | 1 | 0 | 0 | 1 | 0 | 1 | 0 | 1 | 0 | 0 | 1 | 0 | 0 | 0 | 0 | 1 |
| 18 | | 1 | 0 | 0 | 0 | 1 | 0 | 1 | 0 | 1 | 0 | 0 | 1 | 0 | 0 | 0 | 1 | 0 |
| 19 | | 0 | 1 | 0 | 1 | 0 | 0 | 0 | 0 | 1 | 1 | 1 | 0 | 0 | 0 | 1 | 0 | 0 |
| 20 | | 1 | 0 | 0 | 1 | 0 | 0 | 0 | 0 | 1 | 1 | 1 | 0 | 0 | 1 | 0 | 0 | 0 |
| 21 | | 0 | 1 | 0 | 1 | 0 | 0 | 0 | 1 | 1 | 0 | 1 | 0 | 0 | 0 | 0 | 0 | 1 |
| 22 | | 1 | 0 | 0 | 1 | 0 | 0 | 0 | 1 | 1 | 1 | 1 | 0 | 0 | 1 | 0 | 0 | 0 |
| 23 | | 0 | 1 | 0 | 1 | 0 | 0 | 1 | 0 | 1 | 0 | 1 | 0 | 0 | 0 | 0 | 0 | 1 |
| 24 | | 1 | 0 | 0 | 1 | 0 | 0 | 1 | 0 | 1 | 0 | 1 | 0 | 0 | 0 | 0 | 1 | 0 |
| 25 | | 0 | 1 | 0 | 1 | 0 | 1 | 0 | 0 | 1 | 1 | 1 | 0 | 0 | 0 | 1 | 0 | 0 |
| 26 | | 1 | 0 | 0 | 1 | 0 | 1 | 0 | 0 | 1 | 1 | 1 | 0 | 0 | 1 | 0 | 0 | 0 |
| 27 | | 0 | 1 | 0 | 1 | 0 | 1 | 0 | 1 | 1 | 1 | 1 | 0 | 0 | 0 | 1 | 0 | 0 |
| 28 | | 1 | 0 | 0 | 1 | 0 | 1 | 0 | 1 | 1 | 1 | 1 | 0 | 0 | 1 | 0 | 0 | 0 |
| 29 | | 0 | 1 | 0 | 1 | 0 | 1 | 1 | 0 | 1 | 1 | 1 | 0 | 0 | 0 | 1 | 0 | 0 |
| 30 | | 1 | 0 | 0 | 1 | 0 | 1 | 1 | 0 | 1 | 0 | 1 | 0 | 0 | 0 | 0 | 1 | 0 |
| 31 | | 0 | 1 | 0 | 1 | 1 | 0 | 0 | 0 | 1 | 1 | 1 | 0 | 0 | 0 | 1 | 0 | 0 |
| 32 | | 1 | 0 | 0 | 1 | 1 | 0 | 0 | 0 | 1 | 1 | 1 | 0 | 0 | 1 | 0 | 0 | 0 |
| 33 | | 0 | 1 | 0 | 1 | 1 | 0 | 0 | 1 | 1 | 0 | 1 | 0 | 0 | 0 | 0 | 0 | 1 |
| 34 | | 1 | 0 | 0 | 1 | 1 | 0 | 0 | 1 | 1 | 1 | 1 | 0 | 0 | 1 | 0 | 0 | 0 |
| 35 | | 0 | 1 | 0 | 1 | 1 | 0 | 1 | 0 | 1 | 0 | 1 | 1 | 1 | 0 | 0 | 0 | 1 |
| 36 | | 1 | 0 | 0 | 1 | 1 | 0 | 1 | 0 | 1 | 0 | 1 | 1 | 1 | 0 | 0 | 1* | 0 |
| 37 | | 0 | 1 | 1 | 0 | 0 | 0 | 0 | 0 | 1 | 1 | 1 | 0 | 0 | 0 | 1 | 0 | 0 |
| 38 | | 1 | 0 | 1 | 0 | 0 | 0 | 0 | 0 | 1 | 1 | 1 | 0 | 0 | 1 | 0 | 0 | 0 |
| 39 | | 0 | 1 | 1 | 0 | 0 | 0 | 0 | 1 | 1 | 0 | 1 | 0 | 0 | 0 | 0 | 0 | 1 |
| 40 | | 1 | 0 | 1 | 0 | 0 | 0 | 0 | 1 | 1 | 0 | 1 | 0 | 0 | 0 | 0 | 1 | 0 |
| 41 | | 0 | 1 | 1 | 0 | 0 | 0 | 1 | 0 | 1 | 1 | 1 | 0 | 0 | 0 | 1 | 0 | 0 |
| 42 | | 1 | 0 | 1 | 0 | 0 | 0 | 1 | 0 | 1 | 0 | 1 | 0 | 0 | 0 | 0 | 1 | 0 |
| 43 | | 0 | 1 | 1 | 0 | 0 | 1 | 0 | 0 | 1 | 1 | 1 | 0 | 0 | 0 | 1 | 0 | 0 |
| 44 | | 1 | 0 | 1 | 0 | 0 | 1 | 0 | 0 | 1 | 1 | 1 | 0 | 0 | 1 | 0 | 0 | 0 |
| 45 | | 0 | 1 | 1 | 0 | 0 | 1 | 0 | 1 | 1 | 0 | 1 | 1 | 1 | 0 | 0 | 0 | 1* |
| 46 | | 1 | 0 | 1 | 0 | 0 | 1 | 0 | 1 | 1 | 0 | 1 | 1 | 1 | 0 | 0 | 1 | 0 |
| 47 | | 0 | 1 | 1 | 0 | 0 | 1 | 1 | 0 | 1 | 1 | 1 | 0 | 0 | 0 | 1 | 0 | 0 |
| 48 | | 1 | 0 | 1 | 0 | 0 | 1 | 1 | 0 | 1 | 0 | 1 | 0 | 0 | 0 | 0 | 1 | 0 |
| 49 | | 0 | 1 | 1 | 0 | 1 | 0 | 0 | 0 | 1 | 1 | 1 | 0 | 0 | 0 | 1 | 0 | 0 |
| 50 | | 1 | 0 | 1 | 0 | 1 | 0 | 0 | 0 | 1 | 1 | 1 | 0 | 0 | 1 | 0 | 0 | 0 |
| 51 | | 0 | 1 | 1 | 0 | 1 | 0 | 0 | 1 | 1 | 0 | 1 | 0 | 0 | 0 | 0 | 0 | 1 |
| 52 | | 1 | 0 | 1 | 0 | 1 | 0 | 0 | 1 | 1 | 1 | 1 | 0 | 0 | 1 | 0 | 0 | 0 |
| 53 | | 0 | 1 | 1 | 0 | 1 | 0 | 1 | 0 | 1 | 1 | 1 | 0 | 0 | 0 | 1 | 0 | 0 |
| 54 | | 1 | 0 | 1 | 0 | 1 | 0 | 1 | 0 | 1 | 1 | 1 | 0 | 0 | 1 | 0 | 0 | 0 |
| 55 | 1 | X | X | X | X | X | X | X | X | 1 | X | X | X | X | X | X | X | X |

*AT STOP-Valve opens but movement can not occur.

APPARATUS FOR SIDESHIFT CARRIAGE CONTROL

BACKGROUND OF THE INVENTION

This invention relates generally to material handling vehicles and, more particularly, to an improved apparatus for controlling a sideshift carriage in such vehicles which are particularly adapted for narrow aisle use.

The high cost of warehouse space makes it economically desirable to extend storage racks vertically and also to provide the narrowest possible aisles between adjacent storage racks. Minimum aisle width is ordinarily dictated by the material handling vehicle to be used in the aisle as well as the size of the material to be stored. Material is typically stored in pallet sized loads and, hence, a desired pallet size is selected for use in a given warehouse.

In an attempt to reduce aisle size, side loading trucks have oftentimes replaced standard fork trucks since fork trucks must turn 90° to face a rack in order to pick up or deposit a load. Even fork trucks designed to have minimum turning radii thus require relatively large aisle widths.

Side loading trucks, on the other hand, travel longitudinally along an aisle and are provided with a load shifting mechanism which allows a load to be extended laterally beyond one or, more often, both sides of the truck and be lowered onto or picked up from a shelf of a storage rack. Such side loading trucks ordinarily utilize a laterally shiftable traverse carriage having a load supporting or manipulating device, typically a pair of load forks, pivotally mounted to the traverse carriage such that it can be rotated through 180° about a vertical axis to access each side of an aisle.

Since a side load truck need not turn to pick up or deposit a load, the aisle width required barely exceeds the truck width. Some designs of side load trucks utilize a laterally fixed elevatable carriage which in turn supports a laterally moveable fork carriage. The fixed carriage width obviously must be less than the aisle width to afford adequate clearance for the truck to move up and down the aisles. This limitation reduces the overall lateral shifting of the fork carriage or traverse carriage which in turn limits the distance that the forks can be extended into a storage rack to deposit or pick up a load.

Such limited extension of the load supporting device (typically forks) into a rack can lead to a multiple step procedure for storing or retrieving a load from a shelf of a storage rack. Hence, a load or pallet being stored has to be extended as far as possible into the rack by the limited motion of the traverse carriage, then be set down on the rack with the traverse carriage being partially retracted and then again being raised to pick up the load and position it more completely into the rack. Such multiple step operation may considerably slow down material handling.

To overcome such multiple step operation, an intermediate carriage is positioned between the laterally fixed elevatable carriage and the traverse carriage. The traverse carriage may then be driven to one end of the intermediate or sideshift carriage and then the intermediate carriage itself may be sideshifted in the same direction to extend the forks and load further into a storage rack. Thus, the distance which a load may be laterally shifted is the sum of the distance which the intermediate carriage is shifted and the distance which the traverse carriage is shifted.

The lateral motions of the traverse carriage and the intermediate or sideshift carriage are typically controlled independently of each other by separate controls activated by the operator of the truck. In any event, the operator after having positioned a load onto the forks must move the load to a position approximately centered relative to the truck so that the load may be repositioned on another shelf of a storage rack, removed for shipment or moved to some other desired location.

While the operator in some side loader trucks is elevated to provide a better view of the load manipulation, the operator still must position the traverse carriage and the intermediate sideshift carriage manually. Errors in positioning a load can result in either the load or the fork supporting mechanism extending excessively beyond one or the other side of the truck resulting in collisions with either portions of the storage racks or other goods stored on the racks as the truck moves along an aisle.

It is, thus, apparent that the need exists for an improved control system to permit the operator of a material handling vehicle to more accurately position a load at a preferred load carrying position prior to movement of the truck.

SUMMARY OF THE INVENTION

In accordance with the present invention, an improved apparatus are provided for controlling the sideshift carriage of a material handling vehicle. The invention is applicable to material handling vehicles having a primary carriage or platform, a sideshift carriage mounted for lateral movement relative to the platform, a traverse carriage mounted for lateral movement relative to the sideshift carriage and load supporting means, typically forks, mounted to the traverse carriage.

An operator of a material handling vehicle incorporating the present invention has only to move a single lateral motion control lever to a fork retracting position to return a load to be retrieved to a preferred load carrying position approximately centered on the vehicle. In response to movement of the lateral motion control lever, the sideshift carriage is initially moved to a home position and then the traverse carriage is moved to its full extent on the sideshift carriage to define the preferred load carrying position.

Two home positions are defined for the sideshift carriage and correspond to load retrieval from either side of an aisle. The home positions offset the sideshift carriage to one or the other side of the platform such that a portion of the load supporting means or base of the forks extends a set distance beyond one side of the platform and the load supported on the forks extends approximately an equal distance beyond the opposite side of the platform. This load center, of course, requires that the traverse carriage be moved fully to the appropriate side of the sideshift carriage, i.e., the side of the sideshift carriage to retract a load from a storage rack.

Thus, the sideshift carriage control system defines sideshift carriage home positions and prevents retractive lateral movement of the sideshift carriage beyond those positions. However, the sideshift carriage is able to fully extend the forks for load manipulation since the home position for reversed orientation of the forks is ineffective to limit sideshift carriage movement for extending the forks into a storage rack. Similarly, the sideshift carriage can pass back through the inappropriate home position for withdrawal or retraction of the forks from a storage rack such that the sideshift carriage can be positioned to the appropriate home position and the load can be moved to the preferred load carrying position upon withdrawal or retraction of the traverse carriage.

Hence, as the forks are withdrawn from a rack, the sideshift carriage passes through the inappropriate home position and travels to the appropriate home position at which point the lateral motion of the sideshift carriage is stopped. The traverse carriage is then moved in the same direction that the sideshift carriage traveled to a fully withdrawn position on the sideshift carriage. In this way, a load is automatically withdrawn or moved to a preferred load carrying position approximately centered on the vehicle and yet the forks can be fully extended to the entire mechanical limits of the sideshift carriage for extension of the forks into the storage racks to deposit or retrieve a load.

The home or stop positions of the sideshift carriage are determined by the dimensions of a load to be handled and the load supporting means or forks to accommodate applications wherein the load plus the base of the load supporting means or forks exceeds the dimensions of the vehicle platform. In accordance with the present invention, the forks are retracted to a preferred load carrying position where the base of the forks extend beyond the platform in one direction and the load extends beyond the platform in the other direction with the extensions of the base of the forks and the load beyond the opposite sides of the platform being approximately equal to one another.

The traverse carriage preferably comprises an elevation or lift mast assembly along which the forks are elevated. The material handling vehicle may also comprise a movable base from which a lift carriage is supported for vertical movement along a primary elevation or lift mast assembly. Also, the operator may be supported within the lift carriage for improved observation of material handling operations.

In accordance with one aspect of the present invention, the positions of the load carrying means or forks are determined by sensing means or electrical switches and the full extension of the forks by means of lateral movement of the traverse carriage and the sideshift carriage is permitted only if the forks are properly oriented to be moved into a storage rack. That is, the movement of the sideshift carriage is limited between the home or stop positions unless the forks are rotated fully to face one side or the other of the vehicle.

In accordance with another aspect of the present invention, to encourage proper operation of the material handling vehicle, the maximum speed of the vehicle is limited unless the load is carried in a preferred load carrying position. The preferred load carrying position is defined by the traverse carriage being fully moved to one side of the sideshift carriage, the sideshift carriage being positioned in the appropriate home or stop position and the forks being fully rotated to the appropriate side of the vehicle.

It is, therefore, an object of the present invention to provide an improved sideshift carriage control system for a material handling vehicle wherein the sideshift carriage is automatically positioned at a home position to define a preferred load carrying position for the forks of the vehicle upon retraction of the forks.

Other objects and advantages of the invention will be apparent from the following description, the accompanying drawings and the appended claims.

BRIEF DESCRIPTION OF THE DRAWINGS

FIGS. 7A and 7B are signal charts showing the output signals generated by the circuitry of FIG. 5 in response to possible combinations of input signals generated by switches utilized in the present invention.

DETAILED DESCRIPTION OF THE INVENTION

Figure 1:
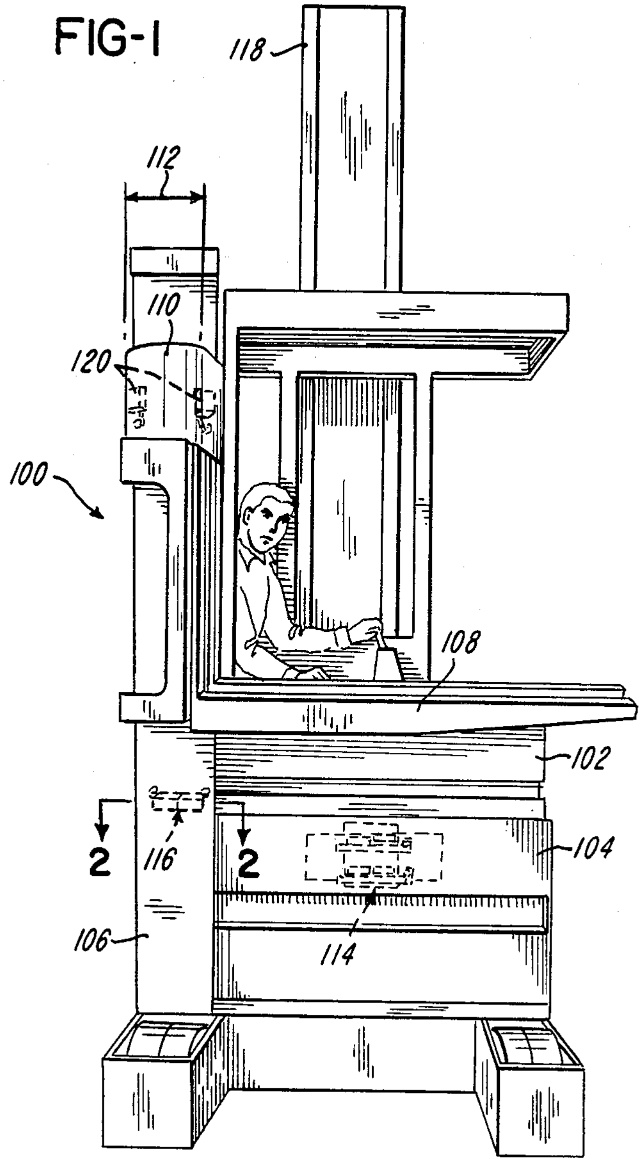
FIG. 1 shows a material handling vehicle incorporating the present invention.

FIG. 1 shows a material handling vehicle 100 incorporating the improved apparatus in accordance with the present invention which permits the vehicle to operate in accordance with the improved method for sideshift carriage control provided by that apparatus.

The material handling vehicle 100 comprises a primary carriage or operator's platform 102 to which a sideshift carriage 104 is mounted for lateral movement back and forth across the platform. In turn, a traverse carriage 106 comprising an auxiliary mast is mounted for lateral movement back and forth across the sideshift carriage 104. Lift forks 108 comprise the material handling or manipulating device of the vehicle of FIG. 1. The forks 108 are mounted for rotation on a turret 110 which is vertically moveable along the auxiliary mast or traverse carriage 106 of the vehicle. The turret 110 has a width 112 which, in the illustrated vehicle, is approximately 9 inches. When a pallet is entirely engaged by the forks 108, the width of the load carried by the truck 100 is the width of the pallet plus the width of the turret 112.

The traverse carriage 106 can be moved across the entire width of the sideshift carriage 104 and, as shown in FIG. 1, is shifted entirely to the left hand side of the sideshift carriage 104 (the right hand side of the sideshift carriage 104 as viewed by the operator of the vehicle). To engage a load with the forks 108, the forks are aligned with the pallet of the load and the traverse carriage 106 is then moved, for example, to the right as shown in FIG. 1, to extend the forks into the rack and under the pallet of the load to be engaged.

As can be seen from the vehicle of FIG. 1, such lateral movement of the traverse carriage 106 extends the forks only to the edge of the platform 102 and, hence, would provide limited extension into the storage racks of a warehouse. To provide additional extension, the sideshift carriage 104 is shifted, in this case, to extend the forks to the right as shown in FIG. 1 (to the driver's left) and hence adequately extend the forks 108 into a storage rack to deposit or retrieve a load typically supported upon a pallet.

Figure 1A:
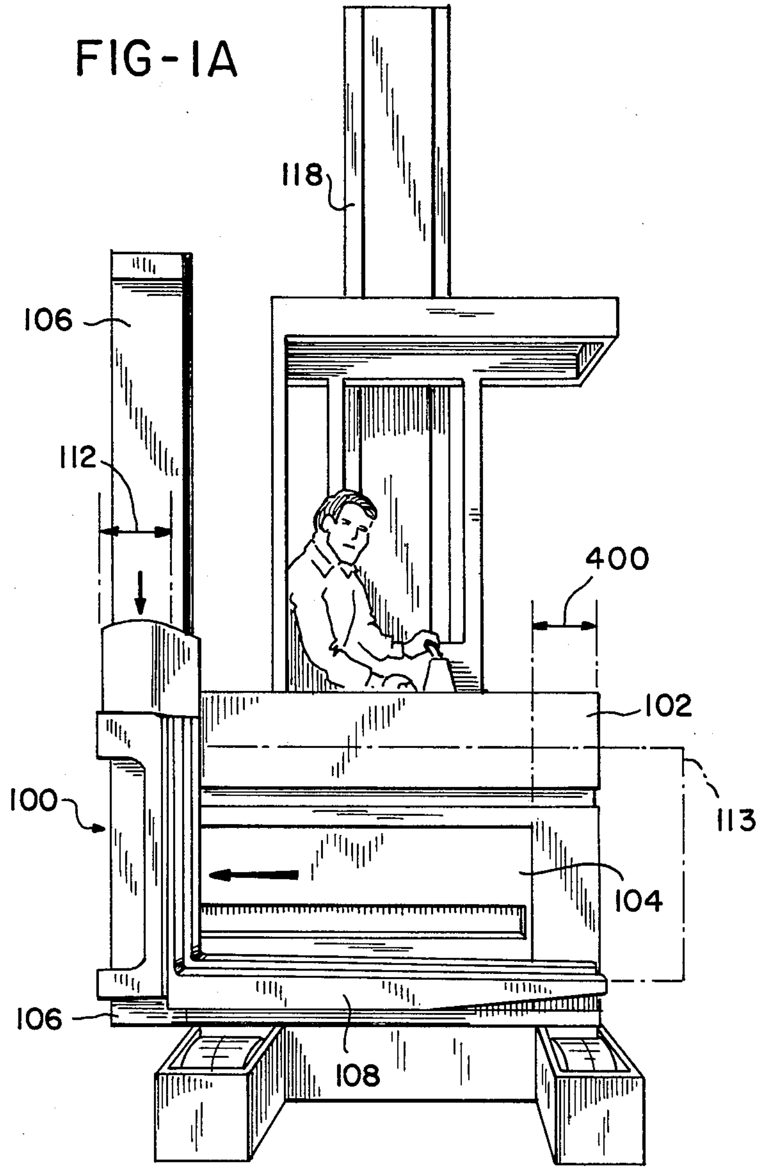
FIG. 1A shows the material handling vehicle of FIG. 1 supporting a load in a preferred load carrying position.

The vehicle of FIG. 1 is shown in FIG. 1A with a load 113 indicated by dash-dot lines supported upon the forks 108. As shown in FIG. 1A, the load 113 and the base of the forks 108 comprising the traverse carriage 106 together extend substantially equal distances beyond opposite sides of the primary carriage 102 to define a first preferred load carrying position. If the forks are directed to the left, i.e., opposite to the direction shown in FIGS. 1 and 1A, the positions of the load 113 and the traverse carriage 106 are reversed to define a second preferred load carrying position. In the preferred load carrying positions, the combination of the load 113 and the load supporting means, i.e., the forks 108 and traverse carriage 106, is centered upon the vehicle 100. The operation of the present invention to position the combination of the load 113 and the load supporting means in the preferred load carrying positions will become apparent.

In accordance with the present invention, sideshift switches 114 are mounted near the center of the operator platform 102 behind the sideshift carriage 104. The sideshift switches 114 are activated by projections which are secured to the sideshift carriage and extend toward the platform 102 as will be more fully described hereinafter.

Also indicated in FIG. 1 are the traverse switches 116 for defining the end limits of travel for the traverse carriage 106. Operation of the traverse switches 116 signal the end locations of the traverse carriage 106 on the sideshift carriage 104 to the control system in accordance with the present invention. Rotate switches 120 for the forks 108 are also indicated in FIG. 1. The rotate switches 120 signal the system in accordance with the present invention when the forks 108 have been sufficiently rotated to fully face one or the other side of the vehicle 100 and, hence, are properly positioned to be extended into a storage rack.

Figure 2:
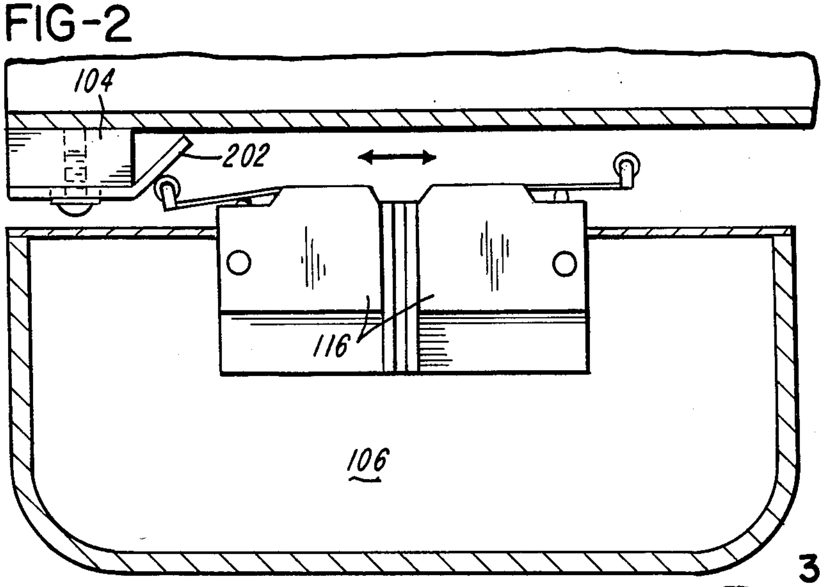
FIG. 2 is a fragmentary sectional view taken along line 2—2 of FIG. 1 showing the arrangement of the traverse switches.

FIG. 2 shows an illustrative embodiment of the traverse switches 116 mounted on the traverse carriage 106. Adjustable stops 202 (only one shown) are mounted to the sideshift carriage 104 to adjustably define the end limits of the lateral movement of the traverse carriage 106 across the sideshift carriage 104. The angled stop 202 at the operator's rightmost side of the sideshift carriage 104 (left side as shown in FIG. 2) has a corresponding leftmost stop (not shown) which is the mirror image of the stop 202 and is mounted at the opposite end of the sideshift carriage 104. Thus, whenever the traverse carriage 106 has been fully shifted on the sideshift carriage 104 such that one of the stops 202 engages and operates the corresponding one of the switches 116, contacts of the switch are closed to indicate to the control system of the present invention that such position has been reached.

Figure 3A:
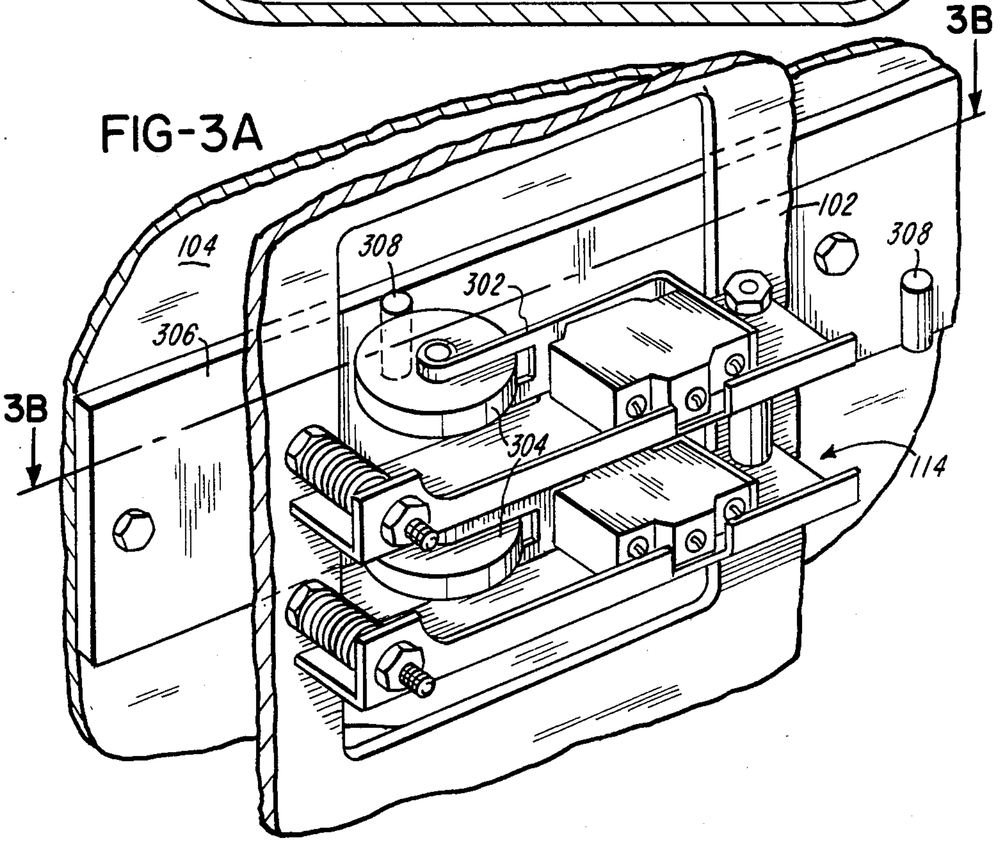
FIG. 3A is a fragmentary perspective view of the arrangement of sideshift control switches and an associated actuating plate.
Figure 3B:
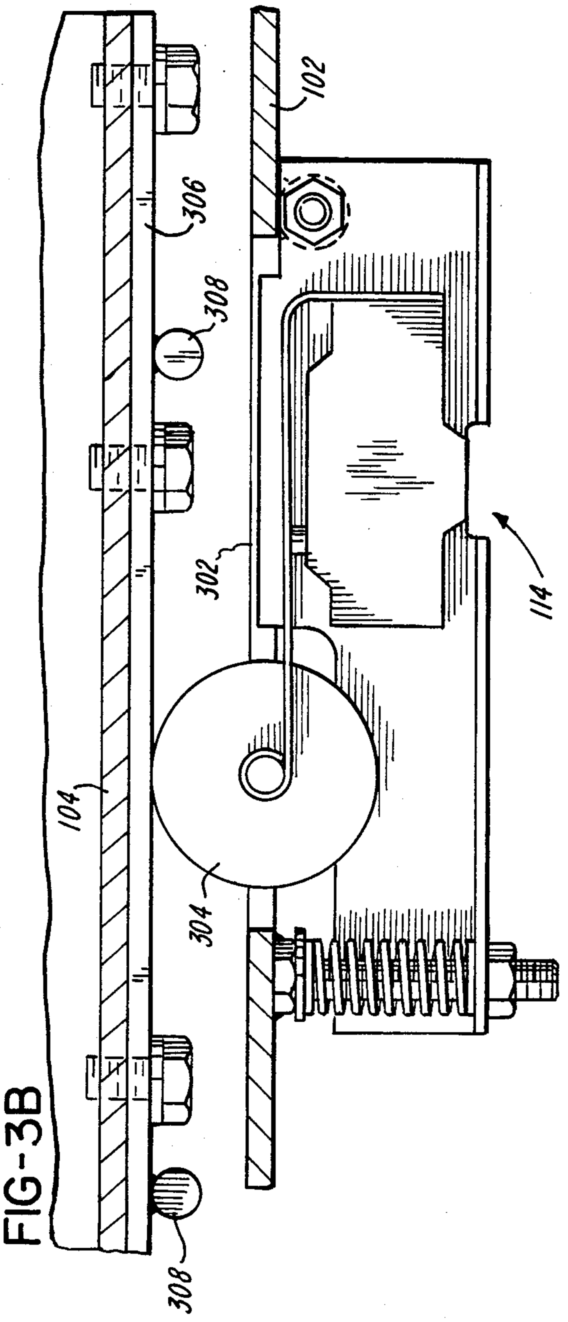
FIG. 3B is a detailed sectional top view of the sideshift switches taken along line 3B—3B of FIG. 3A.
Figure 4:
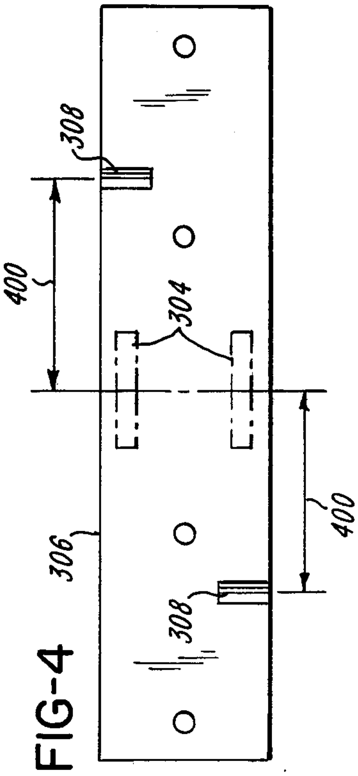
FIG. 4 is a detailed view of an actuating plate mounted to the sideshift carriage for operation of the sideshift control switches of FIGS. 3A and 3B.

FIGS. 3A and 3B show an illustrative embodiment of the sideshift switches 114 which are mounted approximately centered on the platform 102 and face the sideshift carriage 104. The sideshift switches 114 include activating arms 302 with rollers 304 connected thereto. A sideshift actuating plate 306, an example of which is shown in detail in FIG. 4, is secured to the sideshift carriage 104 such that cylindrical extensions 308 of the actuating plate 306 engage the rollers 304 and operate the switches 114 via the switch arms 302 as the sideshift carriage is laterally moved relative to the platform 102.

The sideshift switches 114 are separated vertically from one another such that they are activated by the vertically offset projections 308 of the actuating plate 306 upon excursions of the sideshift carriage 104 toward opposite ends of the platform 102. The actuating plate 306 is approximately centered on the sideshift carriage 104 while the sideshift control switches 114 are mounted such that the rollers 304 are similarly approximately centered on the platform 102. Hence, as the sideshift carriage 104 is moved laterally across the platform 102, one of the extensions 308 will engage its respective roller 304 to close contacts of the corresponding switch 114 indicating that the sideshift carriage 104 is extended the defined distance 400 beyond one or the other side of the platform 102.

The engagement of a roller 304 by a projection 308 defines a home position for the sideshift carriage 104 such that a load supported on the forks 108 is substantially centered side-to-side on the vehicle 100 if the traverse carriage is fully retracted across the sideshift carriage and the forks are rotated to face the appropriate side of the vehicle. Such a centered position of a load on the vehicle is a preferred load carrying position since maximum clearance between the loaded vehicle and the sides of warehouse aisles is obtained.

The offset of the sideshift carriage 104 corresponding to the distance 400 to define an appropriate home position is determined by combining the width 112 of the turret 110 with the length of a load, typically a pallet, supported on the forks 108 to arrive at a total effective load width. The width of the platform 102 is then subtracted from the total effective load width to arrive at the excess load width which will extend beyond the sides of the platform and must be accommodated for travel of the vehicle 100 down narrow aisles of a warehouse. The excess load width is then divided by two to determine the distance 400. Accordingly, when the sideshift carriage 104 is in a home position (the traverse carriage is fully retracted and the forks are properly rotated), the turret 110 or fork support apparatus extends one-half of the excess load width beyond one side of the platform 102 while the load or pallet extends a substantially equal distance beyond the other side of the platform 102 such that the load is optimally positioned for movement of the vehicle 100 along an aisle, see FIG. 1A.

For example, if a 48-inch wide platform is utilized, 48 pallets are to be handled and the turret or fork supporting dimension 112 is equal to 9 inches, the excess load width is: $9+48-48=9$ inches. Hence, an actuating plate having an offset of the actuating projections 308 from the center line of $4\frac{1}{2}$ inches would be provided. It is noted that a variety of positions of the sideshift control switches 114 such that they are not adjacent to one another and are staggered across the platform 102 are possible in accordance with the present invention. However, the preferred centered, adjacent switch mounting as illustrated herein permits the use of a conveniently changeable actuating plate 306 such that a given platform width can be adapted to a variety of pallet sizes and/or aisle width applications simply by means of changing the actuator plate 306 to provide a new distance 400 defining new home positions and still provide automatic return of a load to a preferred load carrying position on the vehicle or truck.

In accordance with an additional feature of the present invention, the truck is permitted to operate at its maximum speed only when a load is positioned at the preferred carrying position. That is, the sideshift carriage is in the appropriate home position, the traverse carriage is fully withdrawn and the forks are fully rotated to face in the appropriate direction.

Figure 5A:
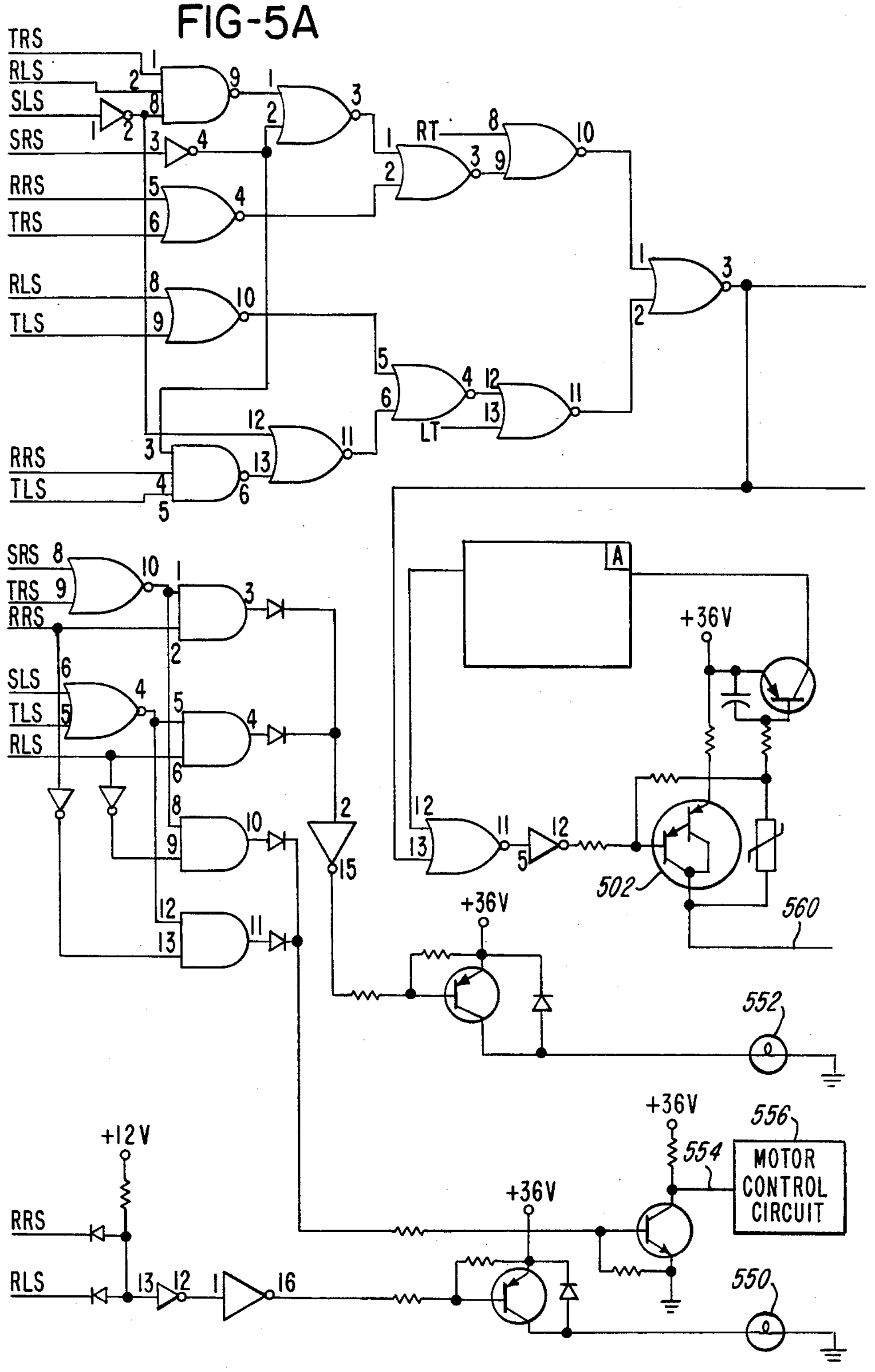
FIGS. 5A and 5B when combined, as shown in FIG. 5C, form a schematic diagram of an illustrative embodiment of decoding circuitry.
Figure 5B:
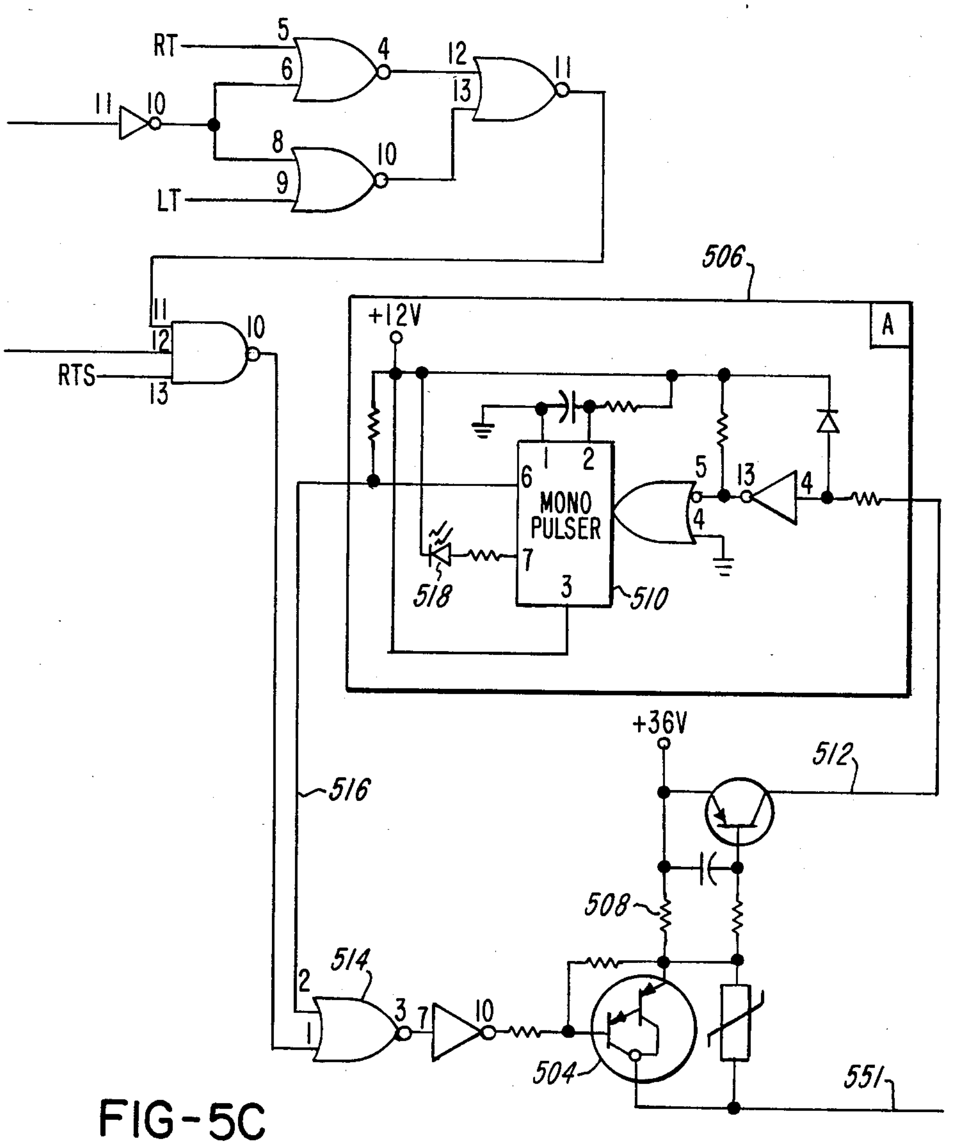
Figure 6:
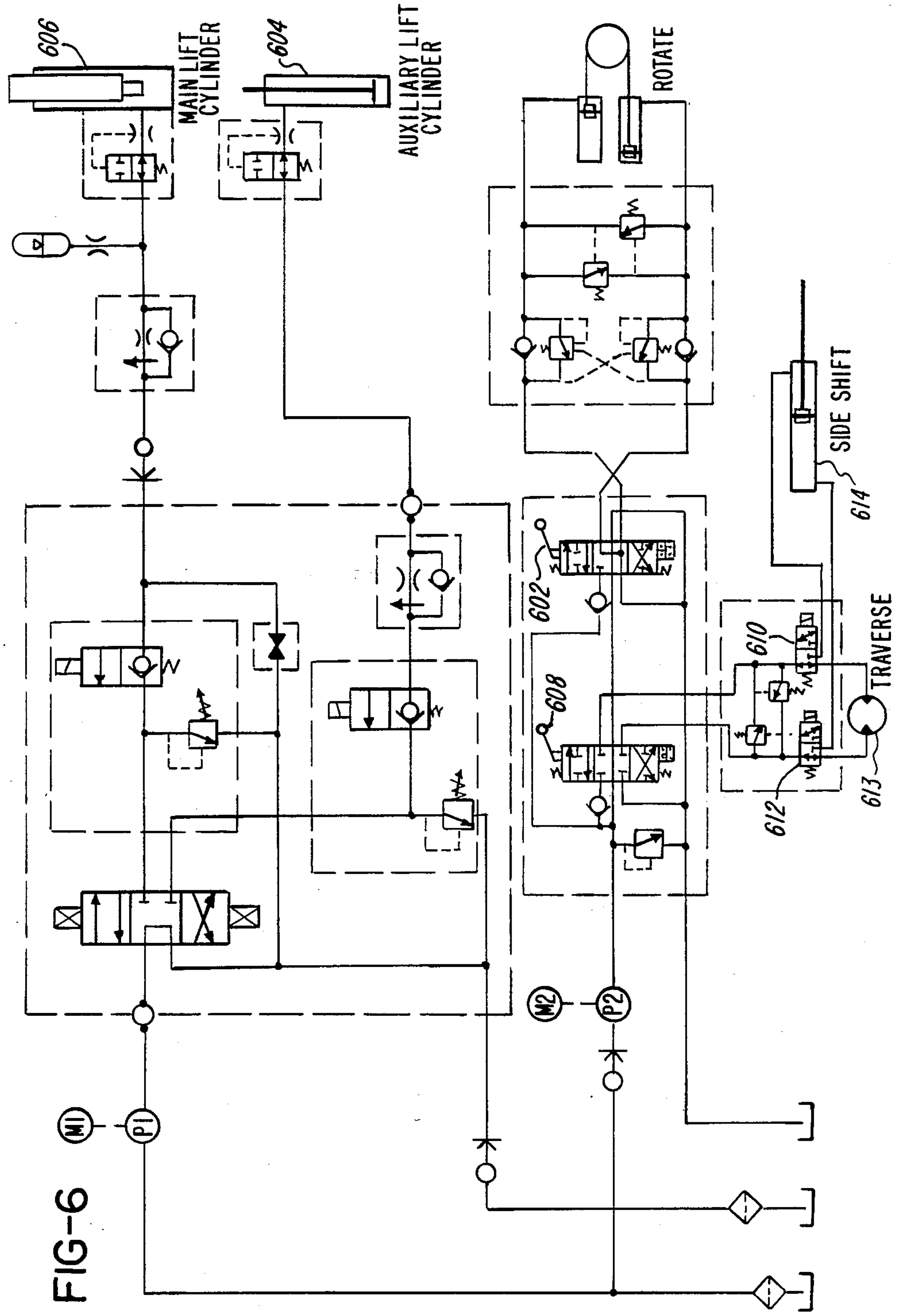
FIG. 6 is a hydraulic circuit diagram for a material handling vehicle incorporating the present invention.

Operation of the improved sideshift carriage control system in accordance with the present invention is performed by decoding the input signals shown on FIGS. 5A and 5B which are generated by closure of contacts of the sideshift control switches 114 (SRS-sideshifted right; SLS-sideshifted left), the traverse carriage control switches 116 (TRS-traversed right; TLS-traversed left), the fully rotated switches 120 (RRS-rotated right; RLS-rotated left), lateral shift switches (not shown, LT and RT) which are incorporated into a hydraulic lateral motion control switch and a rotate switch (not shown, RT) which is incorporated into a hydraulic rotate switch, the hydraulic switches being shown in the hydraulic diagram of FIG. 6 as will be described hereinafter.

Proper decoding of the output signals generated by contact closures of these switches is shown in FIGS. 7A and 7B. One working embodiment of a decoder circuit for generating the output signals indicated in FIGS. 7A and 7B to perform proper sideshift carriage control in accordance with the present invention is shown by the decoder gating circuitry schematic of FIGS. 5A and 5B.

The input signals to the gating circuitry are active low, i.e., when the input signals are connected to ground by closure of the associated switches, and hence the logic operations performed by the gating circuitry of FIGS. 5A and 5B are performed in negative logic. The decoding of the switch closure input signals, as shown in FIGS. 5A and 5B, to arrive at the output signals indicated in FIGS. 7A and 7B is a hardware implementation. Alternatively, contacts of the above-noted switches can be monitored, for example, by a microprocessor, which in turn generates the appropriate output signals upon detection of the indicated combinations of input signals. Such decoding can be performed by table lookup procedures in a microprocessor or by an appropriate program which could easily be prepared by one of ordinary skill in the art in view of the decoding charts shown in FIGS. 7A and 7B and the present description of the invention.

In addition to the decode function performed by the gating circuitry of FIGS. 5A and 5B, solenoid valve driver transistors 502 and 504 are protected by circuitry shown in the box labeled A. Since both of the driver transistors 502 and 504 are protected in the same manner, only the protection of the transistor 504 by the circuitry shown in the schematic diagram of the A box 506 will be described. In one operable implementation of the schematic of FIGS. 5A and 5B, the driver transistors 502 and 504 comprise ULN-2000A darlington transistors commercially available from Sprague.

A 0.2 ohm resistor 508 serves as a current monitoring resistor for the solenoid valve current which flows through the driver transistor 504. If the solenoid valve current reaches approximately 2.5 amps, a monostable multivibrator 510 is activated through a conductor 512. The monostable multivibrator 510 is set to generate a pulse of approximately 1 second which is connected to one of the inputs of a NOR gate 514 via a conductor 516 to disable the base drive for the driver transistor 504. Hence, if the collector of the driver transistor 504 is inadvertently shorted or a fault occurs in the operating coil of the solenoid valve driven by that transistor, the current is allowed to reach 2.5 amps and then is turned off for approximately 1 second before the transistor 504 is reactivated. A light emitting diode 518 signifies that an overcurrent condition is present in the associated driver transistor. An appropriate monostable multivibrator is commercially available from Motorola as an MC14538B.

Operation of a material handling vehicle incorporating the improved sideshift carriage control system in accordance with the present invention will now be described. It will be presumed that the material handling vehicle shown in FIG. 1 is to be operated for retrieving material from a storage rack of a warehouse. As shown in FIG. 1, the forks 108 are shown in the forks facing right home position to access the righthand side of an aisle. It is to be understood that all directions will be given relative to viewing the vehicle as shown in FIG. 1 rather than from the operator's perspective which is completely reversed.

The operator initially travels down an aisle to a section of storage racks containing a load to be removed and the vehicle is stopped to position the forks 108 opposite that load. It appears in FIG. 1 that the forks are fully rotated to face the right side of the aisle in which the material handling vehicle 100 is operating. If this is true, the forks fully rotated light 550 is lighted in the operator's compartment of the platform 102. In the event that the forks fully rotated light 550 is not lighted or if the operator desires to verify that the forks are fully rotated, the rotate forks hydraulic switch 602 is operated to rotate the forks to face the right side of the aisle as shown in FIG. 1.

The rotate forks hydraulic switch 602 as previously mentioned has an integral electrical switch (not shown) included therein which is activated upon operation of the hydraulic rotate switch 602 to request rotation of the forks in either direction. This electrical switch (not shown) generates the RTS signal shown in the schematic diagram of FIGS. 5A and 5B and the signal charts shown in FIGS. 7A and 7B. The RTS signal causes an output signal to be generated on a conductor 551 by the decoder circuitry of FIGS. 5A and 5B. The output signal on the conductor 551 activates a motor M2 to drive a pump P2, both shown in FIG. 6, to provide hydraulic pressure to perform rotation of the forks and the lateral movement of the traverse carriage and the sideshift carriage (traverse/sideshift).

The operator then activates the auxiliary lift cylinder 604 or the main lift cylinder 606 to vertically move the forks 108 directly or by means of elevating the platform 102 along a primary lift mast 118 of the vehicle 100 shown in FIG. 1. Since the vertical elevation of the forks directly or by means of elevation of an operator's platform is well known in the art, this operation will not be further described herein. The operator thus positions the forks 108 to be inserted into a storage platform along the right side of the aisle as shown in FIG. 1.

With the sideshift carriage 104 in the appropriate home position, i.e., forks facing right for access to the right side of the aisle as shown in FIG. 1, home position light 552 is lighted in the operator's compartment. If the forks are fully rotated to face one side or the other such that the forks rotated light 550 is lighted and the sideshift carriage 104 is in the corresponding home position such that the home position light is lighted, a decoded output signal on the conductor 554 enables the vehicle 100 to be operated at its maximum travel speed by means of a motor control circuit 556. The motor control circuit 556 may be any of a variety of circuits well known in the art and, hence, is not described in detail herein.

The operator next activates the hydraulic lateral motion switch 608 which as previously described has integral electrical switches (not shown) which generate the signals RT for requested lateral movement of the forks to the right and LT for requested lateral movement of the forks to the left. Again, it is to be understood that this motion is relative to the observer of FIG. 1 and the signals may be reversed to correspond to the operator's perspective to provide appropriate lateral motion of the forks.

Figure 5C:
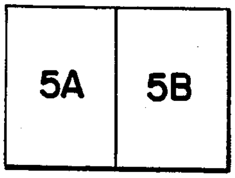

Upon activation of the hydraulic lateral motion switch 606 to move the forks to the right as shown in FIG. 1, an RT signal is generated and decoded by the circuitry of FIG. 5 in combination with other input signals to generate an output signal on the conductor 551 to activate the pump motor M2 to operate the pump P2 and hence provide hydraulic pressure for lateral motion of the forks.

Initially, the traverse carriage 106 is moved to the right side of the sideshift carriage 104 since the solenoid valves 610 and 612 are not activated. Once the traverse carriage 106 has reached the far righthand side of the sideshift carriage 104, the righthand switch 116 as shown in FIG. 2 is activated by the corresponding angled activator 202 (not shown). The decode circuitry of FIGS. 5A and 5B generates a close solenoid signal on the conductor 560 which operates the solenoid valves 610 and 612 to divert pressurized hydraulic fluid from a hydraulic motor 613 which moves the traverse carriage 106 across the sideshift carriage 104 to the hydraulic cylinder 614 which causes the sideshift carriage 104 to be moved to the right.

The sideshift carriage 104 will move through the forks facing left home position which provides proper location of the sideshift carriage when the forks 108 are rotated to the left side of the aisle. However, since the forks are to be extended to the right, the forks facing left home position is ignored by the decode circuitry of FIGS. 5A and 5B. Thus, the motor activating signal on the conductor 551 is maintained to operate the motor M2 for further lateral motion of the forks 108 through and beyond the forks facing left home position to the full mechanical extent of the sideshift carriage 104. The operator may then elevate the forks 108 to pick up the load and withdraw or retract the forks from the storage rack with the load engaged thereon.

It is noted that once the sideshift carriage is beyond the forks facing left home position extending into the storage racks on the right side of the aisle, the forks 108 may be rotated to manipulate the load within the rack. The forks may, thus, be rotated out of the fully right facing position which is required for extension beyond the forks facing left home position. While the forks are rotated out of the fully right facing position, the sideshift carriage 108 may be moved from the fully extended position by lateral movement of the sideshift carriage 104. Such lateral movement is limited between the fully extended and the forks facing left home position since if the forks are rotated other than to a fully right facing position and the sideshift carriage 104 is retracted to or beyond the forks facing left home position, then the sideshift carriage 104 cannot be extended beyond the forks facing left home position until the forks are once again rotated to be fully right facing. Such operation prevents initial full extension of the forks into a storage rack until the forks are properly oriented in a fully rack facing position and yet permits manipulation of a load while the forks are fully extended into the rack beyond the forks facing left home position.

Once the load has been engaged upon the forks 108, the operator moves the lateral motion control lever 608 to retract the forks to the preferred load carrying position defined by the sideshift carriage 104 being in its forks facing right home position, the traverse carriage 106 being fully moved to the lefthand side of the sideshift carriage 104 and the forks being rotated to fully face right. In this position, the fork supporting apparatus extends beyond the left side of the platform 102 by the distance 400 which is approximately equal to the distance that the load extends beyond the righthand side of the platform 102 thus approximately centering the load on the vehicle 100 for maximally efficient travel within a storage aisle.

It is noted that operation of the vehicle of FIG. 1 in the opposite direction to retrieve or store articles in the storage racks to the left side of the vehicle is performed by rotating the forks 108 to the left and simultaneously or in steps transferring the sideshift carriage 104 to the righthand side of the platform and the traverse carriage 106 to the righthand side of the sideshift carriage 104. The sideshift carriage 104 will then attain its fork spacing left home position to define the preferred load carrying position for articles to be retrieved from the lefthand side of the aisle as shown in FIG. 1.

The preceding description of the operation of the improved sideshift carriage control system in accordance with the present invention includes the operating steps required to provide automatic positioning of a load in a preferred load carrying position on the vehicle 100. It is impractical to describe all possible activities resulting from all possible output signals of the decoding circuitry of FIGS. 5A and 5B as shown in FIGS. 7A and 7B. However, such activities can be determined from FIGS. 7A and 7B by consulting the appropriate combination of input signals and the resulting output signals.

While the form of the apparatus described herein constitutes a preferred embodiment of this invention, it is to be understood that the invention is not limited to this precise form of the apparatus and that changes may be made in same without departing from the scope of the invention which is defined in the appended claims.

What is claimed is:

1. In a side loading material handling vehicle having a primary carriage, a sideshift carriage mounted for lateral movement relative to said primary carriage, a traverse carriage comprising an elevating mast assembly mounted for lateral movement relative to said sideshift carriage, and load supporting means comprising material handling forks mounted to and vertically movable along said elevating mast and being extendable to either side of said primary carriage, an improved sideshift carriage control system comprising:

sideshift carriage position sensing means comprising first and second electrical switches mounted to said primary carriage for generating first and second home position signals;

actuator means comprising first and second extensions mounted to said sideshift carriage, said first extension being positioned to engage said first electrical switch when said sideshift carriage is in a first home position corresponding to said load supporting means handling items on one side of said primary carriage and said second extension being positioned to engage said second electrical switch when said sideshift carriage is in a second home position corresponding to said load supporting means handling items on the side of said primary carriage opposite to said one side to thereby cause said sideshift carriage sensing means to generate said first and second home position signals, the position of said first and second extensions being based on the load size to be handled by said vehicle so as to center the elevating mast and the load carried thereby relative to the primary carriage but extending substantially equally beyond opposite sides of the primary carriage; and control means responsive to said first and second home position signals for inhibiting continued lateral movement of said sideshift carriage beyond said first home position for items handled on one side of said primary carriage and for inhibiting continued lateral movement of said sideshift carriage beyond said second home position for items handled on said opposite side of said primary carriage whereby a variety of load sizes may be engaged and supported by said load supporting means in preferred load carrying positions in which said load and said load supporting means together extend substantially equal distances beyond opposite sides of said primary carriage regardless of the side of said primary carriage to which said load supporting means has been extended.

2. An improved sideshift carriage control system as claimed in claim 1 wherein said material handling forks can be rotated 180° to face either side of said primary carriage and said system further comprises switch means for sensing whether said forks are fully rotated to face one or the other side of said primary carriage and for generating fully rotated signals indicating rotation into such side facing positions and said control means is further responsive to said fully rotated signals such that said sideshift carriage is limited to lateral travel between said first and second home positions unless a fully rotated signal is received whereby a load may be engaged by said forks by extension beyond the one of said home positions corresponding to said received fully rotated signal.

3. An improved sideshift carriage control system as claimed in claim 1 wherein said actuator means comprises a plate removably secured to said sideshift carriage whereby said vehicle can be readily adapted to a variety of applications by provision of interchangeable plates which define associated pairs of first and second home positions selected for particular applications.

4. An improved sideshift carriage control system as claimed in claim 3 wherein said vehicle further comprises a movable base and said primary carriage comprises a lift carriage which is supported for elevation along a primary elevating mast assembly connected to said movable base.

5. An improved sideshift carriage control system as claimed in claim 4 wherein said lift carriage is adapted to receive the operator of said vehicle.

6. In a side loading material handling vehicle for placing and retreiving articles stored on shelves of a warehouse storage rack, said vehicle having a movable base, a primary lift mast assembly mounted to said base, a lift carriage supported for elevation on said primary lift mast, a sideshift carriage mounted for lateral movement relative to said lift carriage, a traverse carriage mounted for lateral movement relative to said sideshift carriage and load supporting means which can be rotated 180° to extend to either side of said lift carriage and is mounted to said traverse carriage, an improved sideshift carriage control system comprising:

sideshift carriage position sensing means mounted to said lift carriage for generating first and second home position signals;

actuator means mounted to said sideshift carriage and positioned to engage said sideshift carriage position sensing means when said sideshift carriage is in a first home position corresponding to said load supporting means being fully rotated to handle items on one side of said lift carriage and a second home position corresponding to said load supporting means being fully rotated in the opposite direction to handle items on the side of said lift carriage opposite to said one side to thereby cause said sideshift carriage sensing means to generate said first and second home position signals;

switch means for sensing whether said load supporting means are fully rotated to face said one side of said opposite side of said lift carriage and for generating fully rotated signals indicating rotation into such side facing positions; and control means responsive to said first and second home position signals and said fully rotated signals such that said sideshift carriage is limited to lateral movement between said first and second home positions unless a fully rotated signal is received whereby a load is engaged by said load supporting means by extension beyond the one of said home positions corresponding to said received fully rotated signal and then supported by said load supporting means in a preferred load carrying position by retracting said load supporting means to the other of said home positions whereat said load is approximately centered on said lift carriage such that said load and said load supporting means together extend substantially equal distances beyond opposite sides of said lift carriage regardless of the side of said lift carriage to which said load supporting means has been rotated and extended.

7. An improved sideshift carriage control system as claimed in claim 6 wherein said traverse carriage comprises a secondary lift mast assembly and said load supporting means comprises material handling forks supported for elevation along said secondary lift mast assembly.

8. An improved sideshift carriage control system as claimed in claim 7 wherein said sideshift carriage position sensing means comprise first and second electrical switches and said actuator means comprise first and second extensions positioned to engage and activate said first and second switches when said sideshift carriage is in said first and second home positions, respectively.

9. An improved sideshift carriage control system as claimed in claim 8 wherein said actuator means comprises a plate removably secured to said sideshift carriage whereby said vehicle can be readily adapted to a variety of applications by provision of interchangeable plates which define associated pairs of first and second home positions determined by a particular application.

10. An improved sideshift carriage control system as claimed in claim 9 wherein said lift carriage comprises an operator platform and is adapted to receive the operator of said vehicle.

11. In a side loading material handling vehicle having a primary carriage, a sideshift carriage mounted for lateral movement relative to said primary carriage, a traverse carriage mounted for lateral movement relative to said sideshift carriage, and material handling forks mounted to said traverse carriage and rotatable 180° to face and be extended to either side of said primary carriage, an improved sideshift carriage control system comprising:

sideshift carriage position sensing means mounted to said primary carriage for generating first and second home position signals;

actuator means mounted to said sideshift carriage and positioned to engage said sideshift carriage position sensing means when said sideshift carriage is in a first home position corresponding to said forks being rotated to face one side of said primary carriage and withdrawn to a load carrying position, and a second home position corresponding to said forks being rotated to face the side of said primary carriage opposite to said one side and withdrawn to a load carrying position to thereby cause said sideshift carriage sensing means to generate said first and second home position signals, respectively;

switch means for sensing whether said forks are fully rotated to face said one side or said opposite side of said primary carriage and for generating fully rotated signals indicating rotation into such side facing positions; and control means responsive to said first and second home position signals and to said fully rotated signals such that said sideshift carriage is limited to lateral travel between said first and second home positions unless a fully rotated signal is received whereby a load is enaged by said forks by extension beyond the one of said home positions corresponding to said fully rotated signal and supported by said forks in a preferred load carrying position by retracting said forks to the other of said home positions whereat said load and said forks together extend substantially equal distances beyond opposite sides of said primary carriage regardless of the side of said primary carriage in which said forks have been extended.

12. An improved sideshift carriage control system as claimed in claim 11 wherein said traverse carriage comprises an elevating mast assembly and said material handling forks are vertically movable along said elevating mast assembly.

13. An improved sideshift carriage control system as claimed in claim 12 wherein said sideshift carriage position sensing means comprise first and second electrical switches and said actuator means comprise first and second extensions positioned to engage and activate said first and second switches when said sideshift carriage is in said first home position and said second home position, respectively.

14. An improved sideshift carriage control system as claimed in claim 13 wherein said actuator means comprises a plate removably secured to said sideshift carriage whereby said vehicle can be readily adapted to a variety of applications by provision of interchangeable plates which define associated pairs of first and second home positions selected for particular applications.

15. An improved sideshift carriage control system as claimed in claim 14 wherein said vehicle further comprises a movable base and said primary carriage comprises a lift carriage which is supported for elevation along a primary elevating mast assembly connected to said movable base.

16. An improved sideshift carriage control system as claimed in claim 15 wherein said lift carriage is adapted to receive the operator of said vehicle.

* * * * *

UNITED STATES PATENT AND TRADEMARK OFFICE

CERTIFICATE OF CORRECTION

PATENT NO. : 4,543,031

DATED : September 24, 1985

INVENTOR(S) : Donald Luebrecht et al.

It is certified that error appears in the above—identified patent and that said Letters Patent is hereby corrected as shown below:

Column 6, line 51, "inch" has been deleted before "pallets."

Column 12, line 26, "of" should read --- or --- (Claim 6).

Column 14, line 8, "in" should read --- to --- (Claim 11).

Signed and Sealed this

*Twenty-fifth* Day of *March 1986*

[SEAL]

*Attest:*

DONALD J. QUIGG

*Attesting Officer* *Commissioner of Patents and Trademarks*